UNITED STATES PATENT OFFICE.

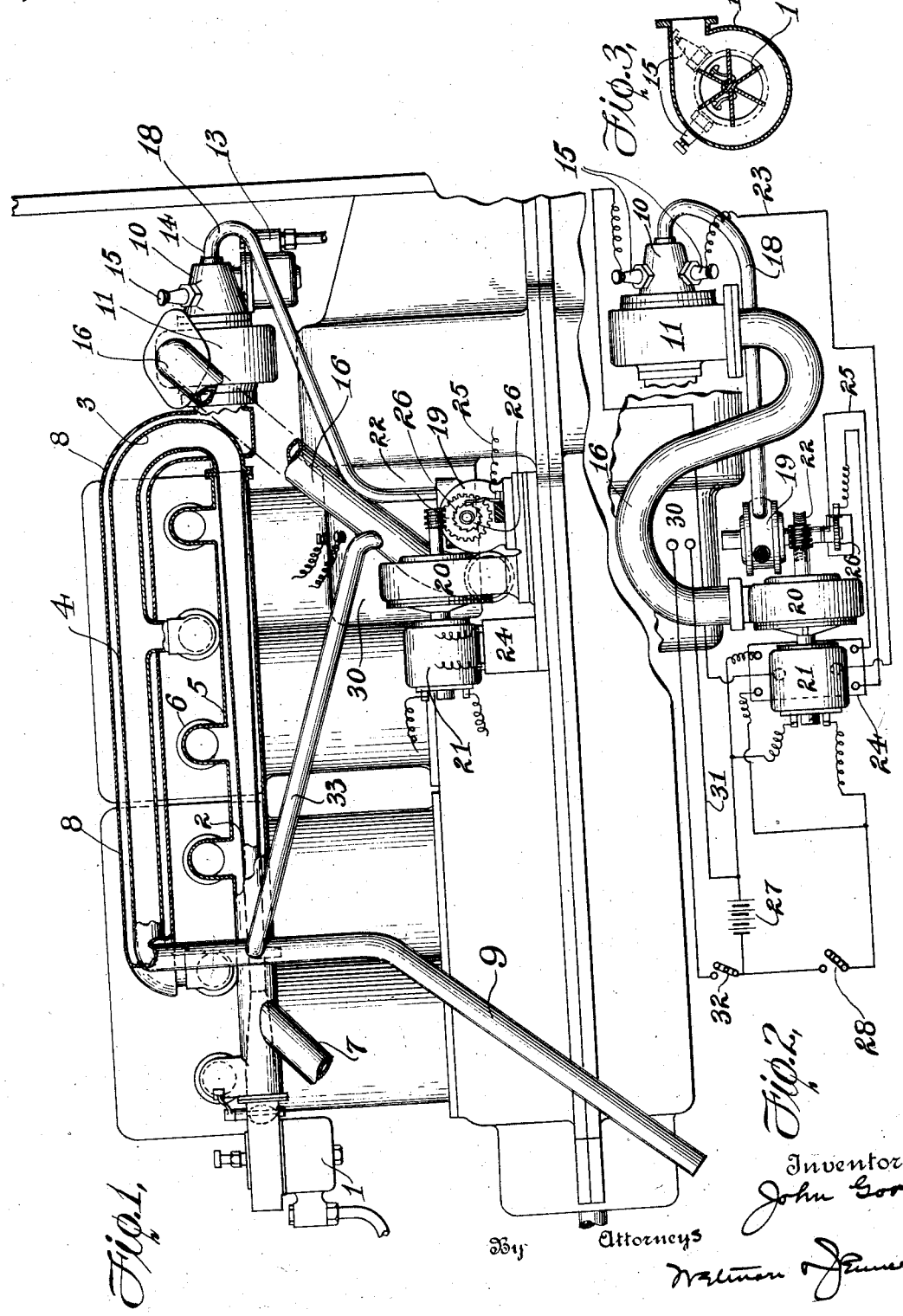

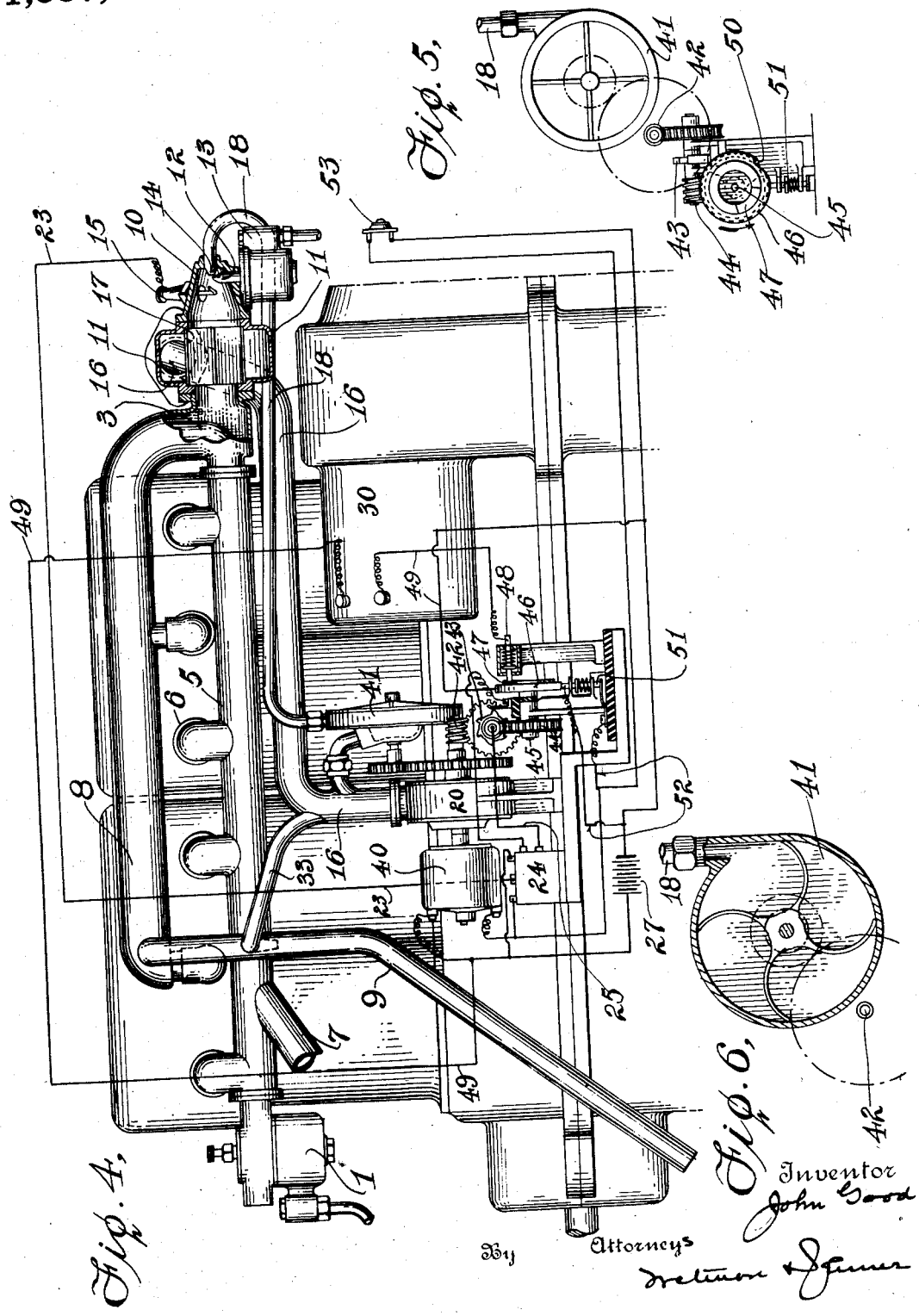

JOHN GOOD, OF BROOKLYN, NEW YORK, ASSIGNOR TO GOOD INVENTIONS CO., OF BROOKLYN, NEW YORK, A CORPORATION OF NEW YORK.

INTERNAL-COMBUSTION-ENGINE POWER PLANT.

1,387,848.

Specification of Letters Patent. Patented Aug. 16, 1921.

Application filed August 30, 1916. Serial No. 117,567.

*To all whom it may concern:*

Be it known that I, JOHN GOOD, a United States citizen, residing in Brooklyn, New York, have invented the following Improvements in Internal-Combustion-Engine Power Plants.

The invention concerns the application of heat to internal combustion engines working on the relatively non-volatile fuels such as kerosene, and is adapted for use on such engines for initially heating their vaporizing elements to enable the combustion process to be started or maintained. More particularly the invention concerns the organization of inclosed flame forced-draft burners in automobile and boat engines whereby the operator may, by the operation of simple control mechanism, first preheat and then start the engine in normal operation with the least delay and the greatest reliability. The invention broadly comprises an organization in which the burner operating mechanism is independently operated from the battery or source of stored energy which also serves to start the engine in motion, and in the sequence of such operation whereby the appropriate temperature may be produced in advance of the engine operation and maintained for an adequate period after such operation has been established. The invention further includes the detail improvements in the structure and arrangement of the burner operating devices and other important and independent features hereinafter made apparent and more specifically pointed out in the claims.

In the accompanying drawings:

Figure 1 is a side elevation of an automobile showing an engine vaporizing element and an inclosed flame burner applied to it according to this invention;

Fig. 2 is a top plan of certain of the parts of Fig. 1, including a diagram of the electric circuits whereby the engine-turning and burner-operating motors are controlled;

Fig. 3 is a cross-section through the burner head;

Fig. 4 is a side elevation with parts in section of a developed form of the organization showing also a modification of the burner operating means;

Fig. 5 is a partly diagrammatic view of the time train; and

Fig. 6 is a large scale section of the second stage air blower.

The engine shown is provided with a fuel and air proportioning device or carbureter 1 from which it draws its charge mixture of air and kerosene oil for example or other relatively non-volatile liquid fuel requiring heat for vaporization. The mixture passes first through the normal engine vaporizer tube 2 around an elbow 3 and through a starting vaporizer tube 4 from which it enters directly into the inlet ports of the engine. The vaporizer tube 2 is contained within the exhaust header 5 where it intercepts the flames from the several exhaust ports 6 on their way to exhaust off-take 7, receiving therefrom the heat to continue the proper vaporization when the engine is in normal action. The rest of the intake passage, including the elbow 3 and the tube 4, is contained in an elongated inclosure 8 which constitutes the flame tube or casing for the initial heating. Flame or hot combustion products traversing this passage from the burner head on the extreme right and escaping at the other end through the burner off-take 9 serve to heat the tube 4 to vaporize the liquid fuel charge passing therethrough when the engine is otherwise cold, and thereby produce a charge mixture which will ignite and operate the engine until the exhaust heat is sufficient to accomplish vaporization in the normal vaporizer 2. During such normal running the flame tube 8, when not used as a heater, may serve as heat insulation to the tube 4. In the case in hand, the normal vaporizer is constituted by a Venturi tube as seen in Fig. 1, being a thin walled tube, extending the full length of the multi-cylinder engine within the exhaust header and directly and closely opposed to all of the exhaust ports, but the invention is not confined to any particular type of engine or engine vaporizer whether that be of the Venturi tube or other type, or whether involving separate vaporizers for starting and normal running as in the present case, or a single vaporizer for both conditions.

The burner head comprises a nozzle cap 10 connected with the flame tube 8 by an annular air inlet chamber 11 and with the tube 8 forming a closed space adapted to contain and confine the flame under moderate pressure. The nozzle cap carries a liquid fuel nozzle 12 supplied with kerosene oil or whatever fuel is used by the engine, from a constant level float receptacle 13, centrally mounted in the cap and in aspirating relation to a fluid pressure or air nozzle 14, so that the atomized fuel spray therefrom passes axially through the air chamber 11, intercepting the opposed terminals of a pair of spark plugs 15 just before it joins the air from said chamber. A spark between these terminals ignites the spray and air admitted through the air chamber 11 continues and completes the combustion within the closed passage. The air reaches the air inlet through a pipe 16 and a star-shaped partition member 17 is placed at about the junction of this air with the ignited spray for directing and assisting the combustion. This type of burner head is known to the art constituting the subject of my Patent No. 1,231,152, and although this type is preferred, other types of inclosed heaters may be employed in its place. In the present case, the burner head is applied to an elbow or angle of the flame tube 8, so that the flame impinges on the interior elbow 3 and is thus subject to change of direction immediately on emerging from the head. Referring more particularly to Figs. 1 to 3, atomizing air or fluid for the nozzle 14 is supplied through pipe 18 from a small blower or rotary air pump 19 and the combustion supporting air is supplied through pipe 16 from a rotary fan blower 20 and both blowers are geared together and driven by a small high speed electric motor 21, the former to provide a relatively high atomizing pressure and the latter a considerable volume of air at a somewhat lower pressure. The blower 20 is directly mounted on the motor shaft and the smaller blower 19 is driven therefrom through a worm and worm gear connection 22 as clearly illustrated in Figs. 1 and 2. The relative air deliveries from the two blowers are predetermined so that the spark will ignite the spray and the flame will be continued to complete combustion under high velocity within the casing 8, and at such pressure as will suffice to overcome the resistance of the offtake 9 and at the same time consume and convert into heat an adequate amount of the fuel. For this purpose the spray produced by the atomizing nozzles 12 and 14 (Fig. 4) is relatively rich, that is to say richer in fuel than would produce complete combustion without the addition of more air from the pipe 16. Such a rich mixture is nonexplosive but is spark-ignitible and by so igniting it combustion is established in the flame passage of a continuous and nonexplosive character. Thus the spark gap is located in a nonexplosive portion of the mixture of fuel and air which is formed within the burner head and flame passage. The spark plugs are connected in a circuit 23 to an induction coil 24 the primary 25 of which is subject to mechanical interruption by the rotary interrupter 26 mounted on the worm shaft 22, and all of these parts are compactly mounted together on a base screwed to the engine casting. The motor 21 is connected to a source of stored energy, represented by the storage battery 7, and a switch 28 is adapted to put it in operation, which results in the immediate establishment of a flame of high temperature passing through the flame tube 8 as will now be understood. The combustion engine is equipped with a starting motor 30 connected by the circuit 31 to the same storage battery 27 and adapted to be set in action by closing the switch 32 adjacent to the switch 28. Starting motors of this kind are entirely familiar to the art and therefore the detail thereof is omitted from the drawings. It will be observed that by first closing the switch 28 the vaporizer 4 can be heated to such extent as required for producing the initial vaporization and thereupon the switch 32 is closed to actuate the engine-turning motor 30 to put the engine in operation, the switch 28 being kept closed and the burner in operation until after the exhaust gas from the engine has established the appropriate temperature at the normal vaporizer 2, and which may require several seconds, or even minutes, depending on the heating apparatus and fuel. The engine is surely put in its normal combustion process, by this overlap of the burner's period and this result is obtained by driving the burner operating members by a motor entirely independent of the engine-turning-motor 30 although driven by energy from the same source. It is of course, also possible to continue the heating of the tube 4 for as long as the circumstances of low volatility of fuel or external temperature may require, or to resume the operation of the burner, after an interruption, to assist the combustion process in the engine.

As a precaution against escape of flame or of very hot exhaust products from the pipe 9, a portion of the combustion supporting air from the blower 20 is shunted across through a pipe 33 to said offtake near its junction with the flame tube 8, and the air so entering either cools the exhaust products or supplies the oxygen necessary to consume immediately any remaining unconsumed or still burning fuel. This feature is of course susceptible of use in connection with inclosed flame burners generally.

In Figs. 4 to 6, the general construction of the engine, its vaporizing means, burner head and appurtenant parts will be recognized without repetition. In this form the electric motor 40 is direct connected to the fan blower 20 and the latter is geared by a speed multiplying train to a second stage, fan blower 41, which receives its air from the outlet air pipe 16 of the blower 20 already at some pressure. This connection suffices to create an adequate atomizing pressure in the delivery pipe 18 which is thus reached in two stages. The armature shaft of the motor also drives the worm gear train 42, shown more clearly in Fig. 5, which operates a rotary circuit interrupter 43 quite the same as the circuit interrupter 26 and for the purpose of producing a spark between the igniter terminals of the plugs 15. The interrupter shaft, through its worm 44, drives a second shaft 45 carrying upon it a disk 46 and the said disk controls the circuits of both the engine-turning motor 30 and the burner-operating motor 40 in a definite sequence. It carries a contact plate 47 on its face which is engaged by the brush 48, the plate and brush being terminals of the circuit 49 of the engine-turning motor, and appropriately insulated for the purpose. The edge of the disk 46 is formed with a cam recess 50 controlling the depression of the spring-actuated circuit closer 51 of a circuit 52 which controls the motor 40 and short circuits the main control button 53. Without tracing the circuits in detail, it will be apparent that by pressing the button 53 the current from the storage battery 27 will be closed to the motor 40 and the spark coil 24, thereby operating the blowers 20 and 41 and the igniter and thus actuating the inclosed flame burner above described. The same operation also drives the successive worm gears 42 and 44 and the cam disk 46, constituting a time train. The first effect of the rotating disk is to depress the circuit closer 51, thereby closing the circuit 52 of the motor 40 and insuring that the motor circuit will remain closed, even though the pressure on the control member 53 be relieved, and until the said disk has made a complete revolution and its cam recess 50 has again registered with the circuit closer 51. According to the character of the engine and burner this period of motor operation may be one minute or longer, or any necessary length of time, and it will be understood that the time train is geared to consume this period of time in causing one revolution of the disk 46. The burner is thus operated for one minute regardless of the duration of the operator's pressure upon the push button 53. The second function of the cam disks 46 is accomplished when it revolves the contact plate 47 into contact with the brush 48, thereby closing the circuit 49 of the engine-turning motor, which function it performs after a predetermined and appropriate time interval from the starting of the burner and as determined by the angular relation of the contact plate 47 on the disk. The duration of the closure of the circuit 49 is determined by the arcuate length of the contact plate 47 and is of course sufficient to see the engine well under its combustion process. After the plate 47 has parted from the brush 48—opening the circuit 49 and stopping the engine-turning motor, the closer 51 still remains closed thereby continuing the operation of the burner operating for a further interval and until the cam disk 46 has completed its rotation. Thereby the heat of the burner is available to maintain a proper engine temperature until after the normal exhaust from the engine has reached its normal temperature and the engine is thus safely working on the non-volatile fuel employed.

I claim:

1. The combination with an internal combustion engine, of a source of stored energy, an engine-turning motor adapted to be actuated thereby and an independent motor also adapted to be actuated thereby, an inclosed flame burner operated by the latter motor to supply the starting heat and controlling means for said motors whereby the burner may be kept in operation after the engine has started its combustion cycle.

2. The combination with an internal combustion engine, of a source of stored energy, an engine-turning motor adapted to be actuated thereby, an independent motor also adapted to be actuated thereby, an inclosed burner operated by the latter motor to supply starting heat and automatic means whereby said motors are actuated for predetermined time periods.

3. The combination of an internal combustion engine, having a burner for supplying starting heat, of a source of stored energy, and engine-turning motor actuated thereby, an independent motor also actuated thereby for operating the said burner and control means whereby said motors are automatically operated for overlapping time periods.

4. The combination in an internal combustion engine, of a source of stored energy, engine-heating means operated thereby, a time-train operated by said heating means, and an engine-turning motor brought into operation by said time-train.

5. The combination in an internal combustion engine, of engine-turning and burner-operating motors, a storage battery for operating them, a switch for closing the circuit to the burner motor, and a timing device operated by the burner motor and automatically controlling the circuit of the engine motor.

6. The combination in an internal combustion engine, of an inclosed flame burner mechanism, and means for operating it comprising an electric motor, a battery, electric sparking mechanism operated thereby, and air compressor mechanism also operated thereby, and a common supporting base for said motor and said mechanisms, adapted for attachment to the engine casting.

7. The combination with an internal combustion engine having a battery-operated motor for turning it, of means for promoting initial fuel vaporization in said engine comprising an inclosed combustion device applied thereto and driven by a separate battery-operated motor and a single operator's control element for setting said device in operation to generate heat by combustion.

8. The combination in an electrically-started internal combustion engine power plant of an engine heating liquid fuel burner, apparatus for delivering thereto liquid fuel and air in proportions to maintain continuous complete combustion and an electric motor for operating said apparatus.

9. The combination with an electrically-started internal combustion engine of a liquid fuel burner applied thereto having an electric igniter, an electric motor for operating said burner and circuit connections controlling said burner and igniter to set the burner in action.

10. The combination with an electrically-started internal combustion engine of a liquid fuel burner applied thereto, an electric motor for operating the burner and means for limiting the combustion process of the burner to operation for a predetermined time period suited for starting the engine on its normal cycle.

11. The combination with an electrically-started internal combustion engine of a closed-flame liquid fuel burner applied thereto having fuel and air inlets, an electric igniter, an electric motor adapted to furnish fuel and air to said inlets and a battery for simultaneously operating said igniter and motor and thereby preheating the engine.

12. The combination with an internal combustion engine, an engine-turning motor, a preheating device for the engine and means whereby the operation of said device for a predetermined definite period automatically causes the operation of said engine-turning motor.

13. The combination with an internal combustion engine of a battery-operated engine-turning motor, a battery-operated motor and an associated burner mechanism for producing heat by combustion and means whereby the one motor controls the circuit of the other to compel a predetermined sequence in their respective operations.

14. The combination with an internal combustion engine of a single battery, engine-turning and burner-operating motors both operated thereby and circuit connections between said motors and battery arranged to permit the starting of the engine-turning motor during the operation of the other motor.

15. The combination with an internal combustion engine of a closed flame passage for heating a part of the engine, means for producing a flow of air and fuel mixture through said passage, an electric igniter in said passage and a motor for operating said means, all said elements being mounted upon the engine structure but operating independently of the action thereof and a battery with circuit connections for simultaneously actuating the igniter and motor and thereby automatically establishing ignition and continuous combustion in said passage.

16. The combination in a self-impelled vehicle of a propelling engine, having storage battery and an engine-turning motor operated thereby, of means for utilizing the battery energy for preheating the engine comprising an electric motor adapted for operation by the battery current, means operated by the latter motor for supplying liquid fuel and combustion-supporting air to a flame passage in heating relation to the engine, and controlling circuit connections for said motor including an electric igniter located in said flame passage whereby the operation of said motor produces combustion independently of the combustion in said propelling engine.

17. The combination of two electric motors both applied to a self-impelled vehicle power plant, one of said motors being for starting the power plant and the other for operating a forced combustion device, in combination with means for operating said motors in a definite sequence.

18. The combination of two motors both applied to a self-impelled vehicle power plant, one of said motors being for starting the power plant in action and a combustion device operated by the other motor, in combination with means for operating said motors and means for limiting the combustion period of said motor-operated burner.

19. The combination of an inclosed forced combustion device containing an igniter and fuel and air inlets, an electric motor for supplying air and fuel thereto, an interrupter for the igniter circuit driven by said motor and a timing device also driven by said motor and serving to limit the combustion period.

20. In starting means for internal combustion engines the combination with one bustion engines the combination with one part of the engine intake passage which is exhaust-heated and serves as the normal fuel vaporizer and another part thereof serving as a preliminary or starting vaporizer, an inclosed combustion device for heating said heater vaporizer, and controlling means for said combustion device adapted to keep the same in operation to maintain said preliminary vaporizer at a fuel vaporizing temperature until the exhaust gas produces a normal working temperature in the normal vaporizer.

In testimony whereof, I have signed this specification.

JOHN GOOD.